United States Patent [19]

Tijmann

[11] Patent Number: 5,038,622
[45] Date of Patent: Aug. 13, 1991

[54] STRAIN GAGE ASSEMBLY FOR MEASURING EXCESSIVE TENSILE STRAIN OF A FLEXIBLE ELONGATED MEMBER, SUCH AS A STEEL STRUCTURAL CABLE, OR AN ELECTRICAL TRANSMISSION CABLE, OR A GLASS FIBER OPTIC COMMUNICATION CABLE, WHICH MAY SLIGHTLY TWIST UNDER TENSILE STRAIN

[76] Inventor: Willem B. Tijmann, 10718-229th Pl. SW., Edmonds, Wash. 98020

[21] Appl. No.: 455,757

[22] Filed: Dec. 22, 1989

[51] Int. Cl.⁵ ............................ G01L 5/10; G01L 1/10
[52] U.S. Cl. .................................. 73/862.39; 73/778; 73/784; 73/DIG. 1
[58] Field of Search ................ 73/158, 862.39, 862.41, 73/774, 778, 779, 780, 781, 782, 784, DIG. 1, 855, 862.59; 33/787, 788, 789, 790

[56] References Cited
U.S. PATENT DOCUMENTS

| | | | |
|---|---|---|---|
| 2,332,288 | 10/1943 | Zeitlin | 73/766 |
| 2,814,883 | 12/1957 | Strimel | 33/789 |
| 3,295,365 | 1/1967 | Larrigan et al. | 33/790 X |
| 3,897,681 | 8/1975 | Meier | 73/DIG. 1 |
| 4,277,973 | 7/1981 | Hawkes | 73/DIG. 1 |
| 4,305,299 | 12/1981 | Serata | 73/779 |
| 4,562,743 | 1/1986 | Bonine | 73/158 X |
| 4,663,975 | 5/1987 | Parkinson | 73/778 |

Primary Examiner—Charles A. Ruehl
Attorney, Agent, or Firm—Roy E. Mattern Jr.

[57] ABSTRACT

A strain gage assembly is secured between two initially longitudinal locations on the exterior of a flexible elongated member, such as a steel structural cable, or an electrical transmission cable, or a glass fiber optic communication cable, to thereafter upon the subsequent pre-stressing and/or the possible excessive straining of the cable, create an observable or transmittable reading of the excess tensile and torsional strain being sustained by the flexible elongated member. This assembly, in one embodiment, has an in line arrangement of a vibrating wire strain gage, the vibrating wire thereof secured to a calibrated coiled spring, in turn secured to an inner tube shaft, in turn telescopically fitted within an outer tube shaft, secured to the vibrating wire strain gage. Using two spaced securement means, this strain gage assembly is secured to the exterior of a flexible elongated member. One securement means secures the combined vibrating wire strain gage and the outer tube shaft to the flexible elongated member at one location. The other securement means secures the combined calibrated coiled spring and the inner tube shaft to the flexible elongated member at a spaced second location. The inner tube slightly radially turns relative to the outer tube, within controlled limits, to compensate for any slight twisting of the flexible elongated member. This strain gage assembly may include a thermistor, a data transmission means, and/or a signal transmitter means. The strain gage assembly readings are read at random times, scheduled times, or constantly, under static or dynamic loads.

6 Claims, 6 Drawing Sheets

STRAIN GAGE ASSEMBLY FOR MEASURING EXCESSIVE TENSILE STRAIN OF A FLEXIBLE ELONGATED MEMBER, SUCH AS A STEEL STRUCTURAL CABLE, OR AN ELECTRICAL TRANSMISSION CABLE, OR A GLASS FIBER OPTIC COMMUNICATION CABLE, WHICH MAY SLIGHTLY TWIST UNDER TENSILE STRAIN

BACKGROUND

To assist persons desiring to know when structures are being prestressed and/or overstressed and/or undergoing unwanted linear deformation movement, instrumentation has been and is available. Vibrating wire strain gages designed to measure strains in steel structures, such as bridges, piles, tunnel linings, buildings, etc. are available to be installed quickly and easily. These gages utilize the so called vibrating wire principle. A steel wire of these strain gages is tensioned between two end blocks, which are secured to the surface of a steel member. The wire, when plucked, vibrates at its natural resonant frequency. This frequency, however, depends on the wire tension, which varies as the strain in the steel member varies. An electromagnet coil is used to pluck the wire and to measure the frequency of the vibration produced. Any change in frequency is transmitted from the electromagnet coil, via electrical cable leads, to be displayed as a strain change reading to be observed at a so called readout box. In a particular embodiment of this vibrating wire strain gage, a dual coil auto-resonant electrical circuit and driver is used to obtain low frequency dynamic strain measurements up to one hundred and twenty $H_z$. The frequency signals, as necessary, may be transmitted, via electrical cable leads of electrical circuits, over many meters without loss of accuracy and precision.

There are other gages which use the so called vibrating wire principle. For example, there are vibrating wire jointmeters and crackmeters which measure displacements across joints and cracks in concrete, rock, soil, and structural members. In these meters, instruments, or monitors, a shaft is coupled to a spring, which in turn is coupled to a vibrating wire element. Movement of the concrete, rock, soil, and/or structural members causes movement of the shaft, which extends across joints and/or cracks, and is secured at one shaft end to either a portion of concrete, rock, or structural member. The other shaft end is secured to the spring, in turn secured to the vibrating wire, in turn having the housing of this vibrating wire strain gage secured to the concrete, rock or structural member on the other side of the joint or crack. Movement of the shaft, caused by movement of concrete, rock, soil, and/or structural members, on opposite sides of a joint or crack, changes the tension both in the spring and in the vibrating wire, causing a corresponding change in the frequency of vibration of the vibrating wire of the jointmeter or crackmeter. Internal ball joints are employed, as necessary, to allow for degrees of shearing motions. The frequency of vibration of these jointmeters or crackmeters is transmitted through a cable lead to a readout location. At this location the vibration frequency signal may be conditioned and displayed on a so called portable readout box, or continuously monitored by using a data logger.

Other instrumentation used to monitor possible unwanted excessive stresses and/or movements of structures centers on the use of a cantilevered beam on which strain gages are mounted. The beam is held by a ring, which in turn is positioned about a cable, such as a transmission line cable.

This available instrumentation is understood not to be applicable for use while monitoring possible unwanted excessive stresses and/or unwanted movement of flexible elongated members, which when strained tend to twist.

SUMMARY

There are many places where flexible elongated members are used, and if they are preloaded and subjected to prestressing, and then later are overloaded creating excessive tensile strain, the magnitude of such strain should be made known to persons concerned about maintaining the structural integrity of the flexible elongated member and the structural system into which the flexible elongated member is incorporated.

By way of example: oftentimes retaining walls, buildings, bridges and tunnels are tied or anchored into earth. When steel cables, often in composite groups, are utilized, while anchored by using cylindrical concrete anchors of specified size and weight into earth, to hold these structures in place, there is always the need to know how well these steel cables, embedded in the cylindrical concrete anchors, are continuing to maintain the designed long term range of static loads thereof, to successfully continue on in holding these structures, to which they are attached, safely in place. This need to know how well these steel cab les are holding, i.e. how well the tie backs are holding, is often ongoing, such as before, during, and after earthquakes, i.e. both static and dynamic conditions.

At times high voltage power lines because of earth movements, temperature changes, ice loads in winter times and/or high winds, may be excessively stressed, or in reference to a group of them may be unevenly excessively stressed. If these power lines are so stressed, the resulting excessive tensile strain should be made known to persons concerned with the overall structural integrity of the high voltage power transmission system; and Glass fiber optic communication cables must not be over stressed, and therefore should be monitored to determine any excessive strain.

Therefore, this strain gage assembly is provided in various embodiments to be very useful in monitoring the loads being sustained by flexible elongated members to determine whether or not any excessive tensile strain has occurred or is occurring, and if so, what the magnitude was or is. One embodiment of this strain gage assembly has a vibrating wire strain gage, via the housing thereof, arranged to be secured directly or indirectly, at a specific location, to a flexible elongated member. The end of the vibrating wire of this vibrating wire strain gage is secured to a calibrated coiled spring, which increases the range of the vibrating wire strain gage, and makes this gage a so called softer gage. A telescoping assembly of tube shafts is connected, via the larger diameter tube shaft, to the housing of the vibrating wire strain gage, and via the smaller tube shaft to the other end of the calibrated coiled spring.

When this embodiment of this strain gage assembly is completed at this stage, two securement means such as clamps are selected. One securement means is used to secure the outer tube shaft and/or the housing of the vibrating wire strain gage to the flexible elongated member at a first location. Then the other securement means is used to secure the inner tube shaft to the flexible elongated member at a second location, spaced apart from the first location. After installation of the flexible elongated member, this strain gage assembly is positioned, if not already pre-positioned, on the flexible elongated member, and then calibrated to, in effect, read that no excessive strain has occurred. Thereafter, when an excessive strain does occur a signal will be created and be made available to a person or persons who are responsible for monitoring the structural integrity of the system into which the flexible elongated member is incorporated.

When this strain gage assembly is used with others in overall tie back or tie down assemblies in structural installations, for example of earth retaining walls, several strain gage assemblies are spaced along each selected cable to first provide readings of the intentional prestressing of the cable by loadings parallel to the cable and the strain gage assemblies. This prestressing often is applied with a force creating stresses as high as forty five kips, i.e. forty five thousand pounds per square inch of cross sectional cable strand. This prestressing force is distributed, via resistance of an overall anchoring of an overall tie back assembly, from a maximum at the front of the concrete bonded anchor portion to zero at the back of the concrete bonded anchor portion of an overall tie back assembly.

This prestressing is continually monitored by the strain gage assemblies and read during specific times or all the time, as signals are transmitted via cable leads, extending from the strain gage assemblies to read out instruments and/or data loggers from which stress can be calculated. If the readings observed are in excess of the prestressing limits, indicating excessive tensile strain has occurred, an observer creates an alarm to alert all persons concerned with the continuity of the overall structural installation. Also the readings observed may be lower, possibly indicating the overall tie back assembly is failing or has failed. Observation of these readings during static and dynamic times are undertaken, for example, before, during, and after earthquakes for short term or for long term monitoring. The readings are transmitted from many locations, often very remote locations, by using radio wave transmissions, satellite transmissions, or meteor burst transmissions.

In another embodiment of this strain gage assembly, a beam having at least one planar bonded strain gage mounted thereon has a calibrated coiled spring secured to one end thereof, and an extending member is secured to the other end of the calibrated coiled spring. In mounting this embodiment, a securement means is used to secure the beam, at one end thereof, to a flexible elongated member. Then another securement means is used to secure the extending member, at an end thereof, to the flexible elongated member. Following an installation like the installation of the other embodiment, if an excessive strain does occur a signal will be created for review by a person responsible for monitoring the structural integrity of a system into which the flexible elongated member is incorporated.

In respect to other embodiments, other strain gages are used. In respect to all embodiments the strain gages will be incorporated into the overall strain gage assemblies, so the possible slight twisting of the flexible elongated member will be accommodated.

DRAWINGS

The strain gage assembly for measuring the intentional prestressing of a cable and/or later on the excessive tensile strain of a flexible elongated member, which may slightly twist under strain, such as the slight twisting of a steel structural cable, is illustrated in the drawings, wherein.

DESCRIPTION OF PREFERRED EMBODIMENTS

The various illustrated embodiments of the strain gage assembly for measuring excessive tensile strain of a flexible elongated member, which may slightly twist when undergoing a tensile stress, may all be modified in some way. The purpose, in respect to all embodiments is to obtain an accurate signal at a definite critical location, which may be correctly observed and understood at the critical location and/or at a remote location, by a person responsible for observing preloading, and later any excessive loading conditions, wherein there is excessive tensile stress occurring in respective structures and thereafter initiating a selected appropriate action. In some embodiments different strain gages, per se, may be used. In some embodiments different securing means may be used. In some embodiments different signal transmitting means may be used.

Figures 6, 8, 11:
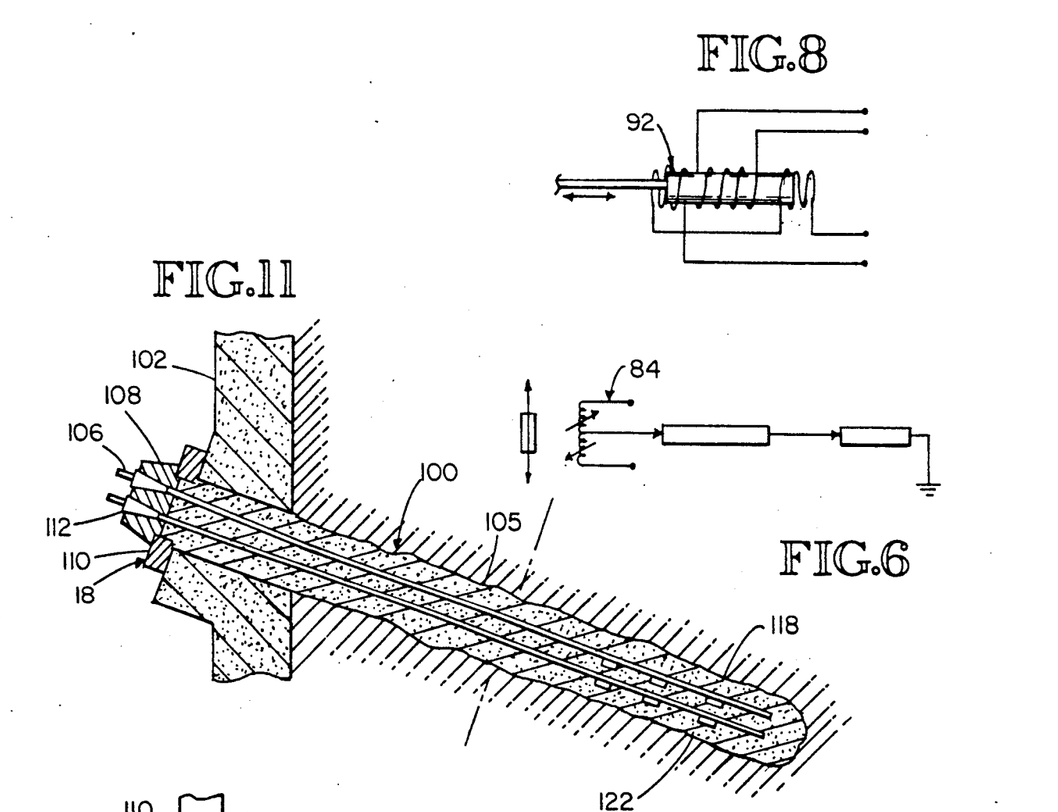
FIG. 6 is a partial schematic side view indicating how a variable reluctance transducer, which is used in place of a vibrating wire strain gage, in assembling the strain gage assembly.
FIG. 8 is a partial schematic side view indicating a linear variable differential transformer, which is used in place of a vibrating wire strain gage, in assembling a strain gage assembly.
FIG. 11 is a side elevation of a tie back assembly used in a structural installation of an earth retaining wall, indicating a portion of the retaining wall, and the tie back assembly arranged within the earth, and further indicating the unbonded length of the tie back assembly, and the bonded length of the tie back assembly, in which the strain gage assemblies are positioned at spaced along a steel structural cable.
Figure 12:
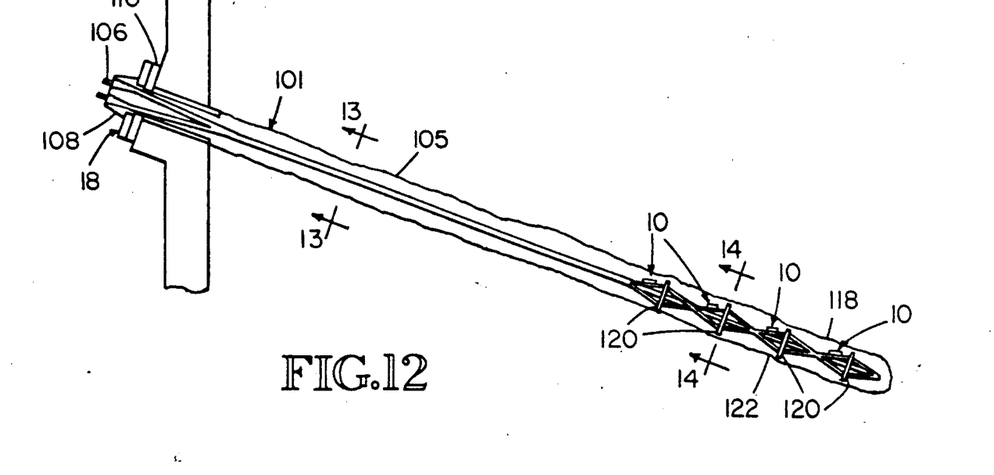
FIG. 12 is a side elevation of a tie back assembly, somewhat similar to the tie back assembly shown in FIG. 11, indicating how the group of steel structural cables are arranged closely together during the unbonded length, and how this group is separated and re-separated in the bonded length, with respect to creating greater holding power and also to create spaces for installing the various strain gage assemblies at spaced locations.

In FIGS. 1, 2, 3 and 4, a strain gage assembly 10, is illustrated in an embodiment 12, which is arranged for securement to a steel structural cable 14 of multiple wire cable strands 16. Such a steel cable 14 may be one of several used as a typical tie back anchor 18 and/or tie down anchor, as shown in FIGS. 11 and 12. A vibrating wire gage 20 within its housing 22, is connected to an electrical cable lead 24, enclosing both power circuitry 26 and a signal circuitry 28, by employing a cable lead gland 30, at one end 32 thereof. At its other end 34, the housing 22 is secured to a larger diameter tube-shaft 36. The vibrating wire 38 of the vibrating wire gage 20, extending out from the housing 22, is connected to and in alignment with a calibrated coiled spring 40 at its leading end 42. The trailing end 44 of this coiled spring 40, is connected to the leading end 46 of a smaller diameter tube-shaft 48, which is telescoped inside the larger diameter tube-shaft 36, and remains relatively movable within the larger diameter tube-shaft 36, with respect to both rotations and longitudinal movement. However, the rotational movement is confined within the limits determined by respective abutments 50, 52.

Figures 1, 2, 3, 4, 5:
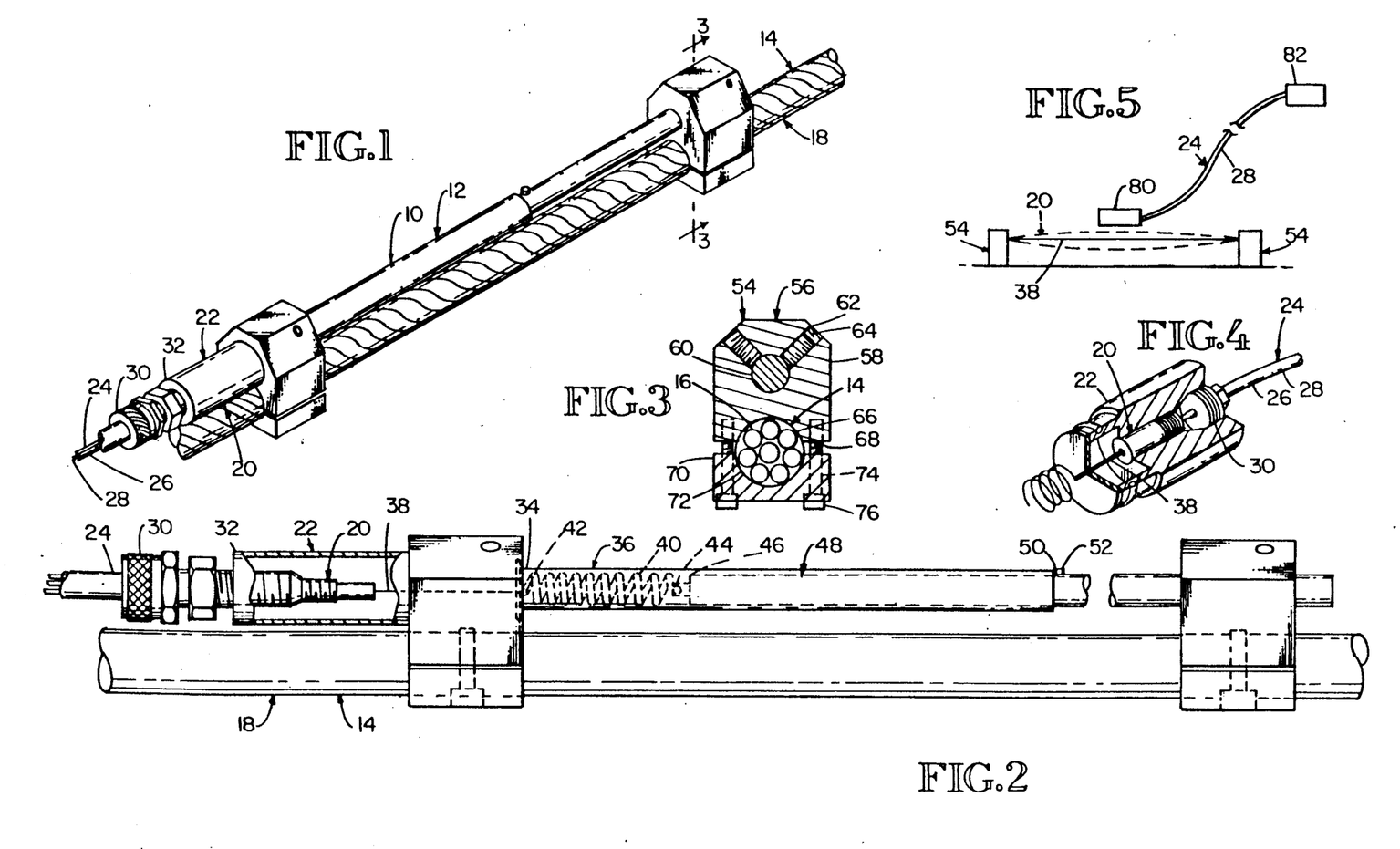
FIG. 1 is a perspective view of one embodiment of the strain gage assembly mounted on a steel cable having multiple strands, indicating the incorporated vibrating wire strain gage and electrical leads thereof.
FIG. 2 is a side view with some portions broken away for purpose of illustration, of one embodiment of the strain gage assembly, as illustrated in FIG. 1.
FIG. 3 is a schematic cross-section taken at line 3—3 on FIG. 2 to show how a securement means, such as a clamp assembly, is used to secure some of the portions of the strain gage assembly to a steel cable at one of two spaced locations.
FIG. 4 is a schematic perspective view of the arrangement of portions of the interior of the vibrating wire gage, illustrated in FIGS. 1 and 2, and also showing the electrical cable leads of both the power and signal circuits, and showing a frequency counter.
FIG. 5 is a partial schematic side view indicating how a vibrating wire gage operates.

This substantial assembly of the components of the strain gage assembly 10 is completed upon the selection of securement means 54, such as the clamp assemblies 56. As shown in FIGS. 1, 2, and 3, each of these clamp assemblies 56, has a top portion 58, with a tube-shaft receiving hole 60, a set screw hole 62, a set screw 64, a concave receiving space 66, to accommodate about one half the diameter of a steel cable 14, and threaded holes 68 arranged adjacent the respective sides of the concave receiving space 66. The bottom portion 70 of each clamp assembly 56, has a concave receiving space 72, to accommodate about one half of the diameter of the steel cable 14, threaded holes 74 arranged adjacent the respective sides of the concave receiving space 72, and threaded bolts 76 for entry into threaded holes 74, and upon assembly, on into holes 68 of the top portion 58.

In FIG. 4, the vibrating wire tensile strain gage 20 is illustrated schematically, indicating: the housing 20, cable gland 30, electrical cable lead 24, power circuitry 26, signal circuitry 28, the vibrating wire 38 and calibrated coiled spring 40. In FIG. 5 the operation of a vibrating wire gage 20 is illustrated schematically. Located over the vibrating wire 38 an electrical coil 80 is used both in exciting with magnets the vibrating wire, like a plucking effect, and in measuring at the same time, via a frequency counter using a readout the possible related frequency change in the vibrating wire 38. Such a frequency change occurs, if the vibrating wire 38, is changed in its effective length, between the securement means 54, which may move, if the tension load or tensile stress changes in the cable strand 14. If the securement means 54 are drawn sufficiently apart, there will be an excessive strain of the cable 14, which is then detected, as the frequency of vibration of the wire changes, and a signal is transmitted, via the signal lead cable, i.e. electrical cable 24, via the signal circuitry 28 thereof, to the frequency counter 82, having a read out, not shown. A reading is observed by a person, responsible for notifying other persons, if any preload and/or an excessive tensile strain has occurred, which may indicate the forthcoming partial failure or extensive failure of a structure, not shown. Such as the failure of an overstressed tie back or tie down anchor and hence the possible failure of a structure to which they are attached.

Figure 7:
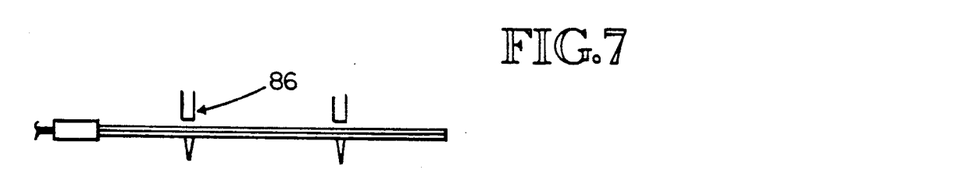
FIG. 7 is a partial schematic side view indicating a magnetostrictive transducer, which is used in place of a vibrating wire strain gage, in assembling a strain gage assembly.
Figures 9, 10, 13, 14:
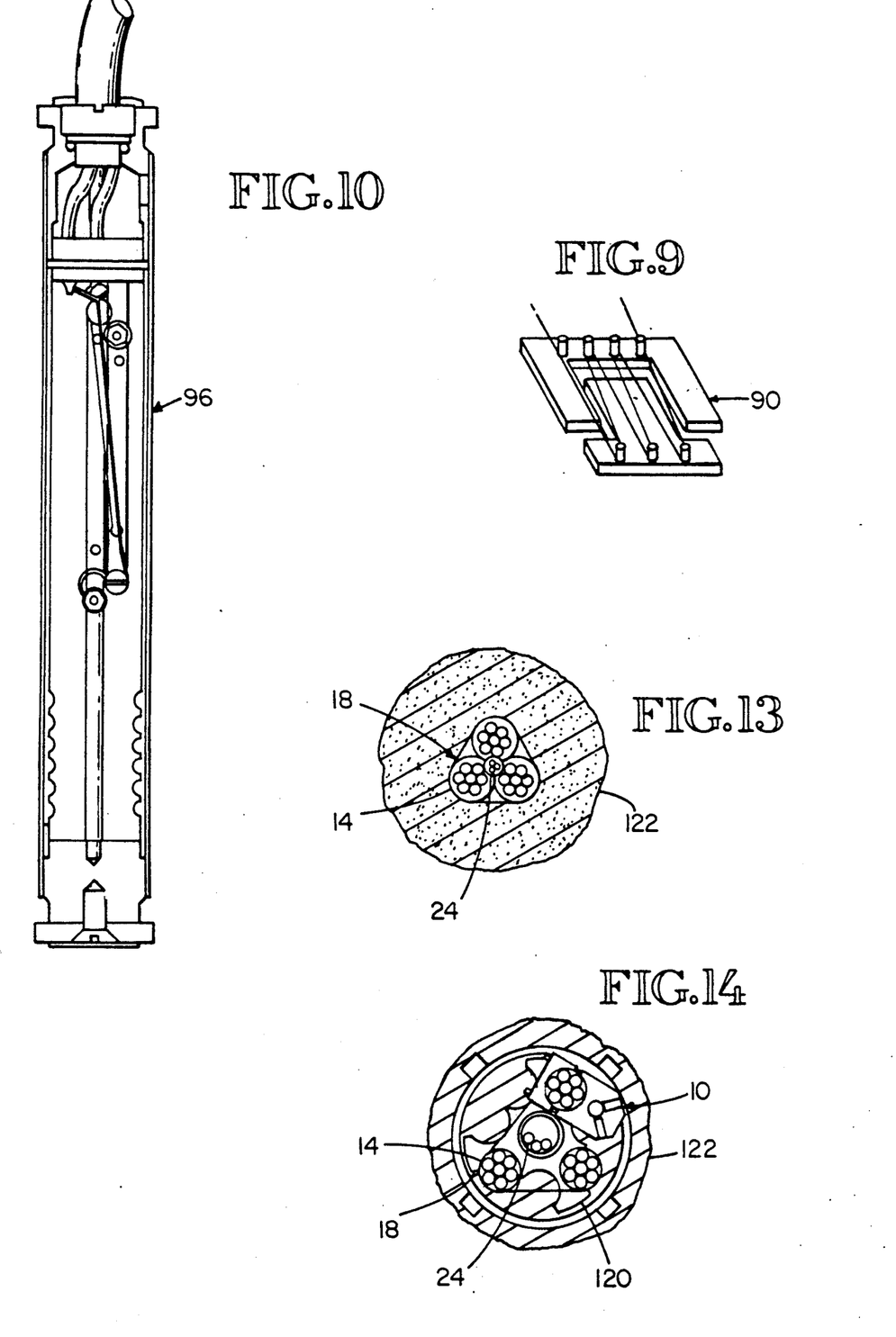
FIG. 9 is a partial schematic top view of an unbonded strain gage, which is used in place of a vibrating wire strain gage, in assembling a strain gage assembly.
FIG. 10 is a side view, with portions broken away for purposes of illustration, of a strain meter utilizing elastic wires, designed by Mr. Carlson, which is used in place of a vibrating wire gage, in assembling a strain gage assembly.
FIG. 13 is a cross sectional view taken at line 13—13 in FIG. 12, to indicate the closely grouped steel structural cables, where their portions are in the unbonded length of the tie back assembly.
FIG. 14 is a cross sectional view taken at line 14—14 in FIG. 12, to indicate how the steel structural cables are separated creating initial spaces in the bonded length of the tie back assembly, which receive cable spacers, then the strain gage assemblies, and thereafter a plastic material such as styrofoam is formed about the installed strain gage assemblies to protect them from the anchoring concrete, subsequently poured in creating the bonded anchored length of this tie back assembly and allow movement of the assembly.

In FIGS. 6 through 10, other gages, per se, which are used in place of the vibrating wire gage 20, are illustrated. In FIG. 6, a variable reluctance transducer 84 serves the gage function. In FIG. 7 a magnetostrictive transducer 86 serving as a gage is illustrated. In FIG. 8, a linear variable differential transformer 92 serving as the gage is shown. In FIG. 9, an unbonded wire resistance strain gage 90 is shown. In FIG. 10, a Carlson strain meter 96 is illustrated which serves as a basis for performing the function of a vibrating wire strain gage.

These strain gage assemblies 10, utilizing selected gages, securement means, and readouts are used in many places such as shown in FIGS. 11, 12, and 15 through 30. As illustrated in FIGS. 11 through 16, the embodiment of this strain gage assembly 10, as shown in FIGS. 1, 2, and 3, is installed as a tie back anchor 18 with one tie back anchor assembly 100 of FIG. 11 or with one tie back anchor assembly 101 as shown in FIG. 12, which would be used with other like assemblies 100 or 101, not shown, to hold a retaining wall 102 in position, for example, adjacent to a highway 104. By way of example, the tie back anchor assemblies 100, 101 have at least a fifteen foot minimum essentially unbonded length 105 from their exposed anchor head 106 and bearing plate 108 with a sub-bearing plate 110 and sleeve 112. Also the tie back anchor assemblies 100, 101 have a maximum bonded length 118 which is at least fifteen feet long.

In the minimum bond length 118, the steel cables 14, such as three, are grouped together with the electrical cable leads 24 as shown in FIG. 13. In the maximum bonded length 118, the three steel construction cables 14 at spaced locations are radially separated before grouting by tendon spacers 120 and so remain separated, as illustrated in FIGS. 12 and 14. Then, as particularly illustrated in FIG. 12, strain gage assemblies 10, such as the embodiment shown in FIGS. 1, 2, and 3, is secured to one of the separated steel cables 14. Following the completed placement of these steel cables 14, and one or more strain gage assemblies 10, and the electrical cables 24 thereof, a plastic such as styrofoam material, not shown, is formed about the strain gage assemblies 10 to keep them free from subsequently poured grout 122. This plastic such as styrofoam material insures the necessary components of the strain gage assemblies will be free to move when a steel cable 14 is stressed sufficiently to cause a strain of any steel cable 14 being monitored. Thereafter grout 122 is pumped in to complete the bonding of the maximum bond length 118 of these tie back anchor assemblies 100, 101.

Figure 15:
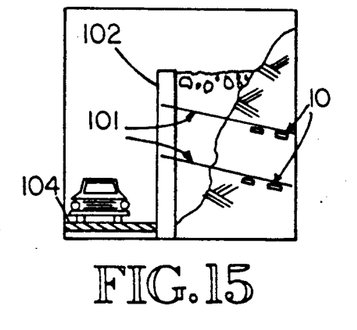
FIG. 15 is a schematic side elevational view of the construction of a retaining wall, at a fill slope site, which is tied back to original ground and then an earth fill is completed behind the wall and over the original ground of earth, and the locations of the strain gage assemblies are indicated in the bonded area.
Figure 16:
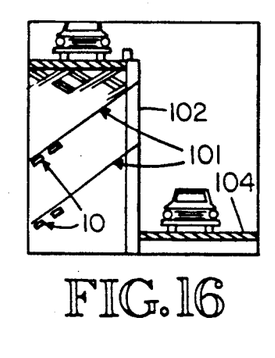
FIG. 16 is a schematic side elevational view of the construction of a retaining wall, at a cut slope site, which is tied back to the original ground of earth, and the locations of the strain gage are assemblies indicated in the bonded area.
Figure 17:
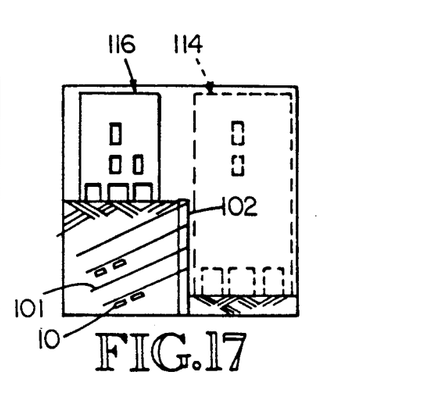
FIG. 17 is a schematic side elevational view of the construction of a retaining wall created during the construction of a new building to protect an older building next to it, and later the new building, from any unwanted original earth movement, indicating how tie backs, equipped with strain gage assemblies, are utilized.

In the schematic FIGS. 15 through 23, selected construction sites have been illustrated wherein the tie back assemblies 100 or 101 are used. In some locations they are referred to as tie down assemblies. In FIGS. 15 and 16, retaining walls 102 are shown where a highway 104 is located. In FIG. 15, the wall was constructed and then an earth fill was made later between the wall 102 and the original ground. In FIG. 16 the original ground was removed. In both FIGS. 15 and 16, the tie back assemblies 101 are illustrated and the locations of the strain gage assemblies 10 are shown. In FIG. 17 a retaining wall 102 is illustrated which has tie back assemblies 101 and strain gage assemblies 10 to insure its initial and follow on position will be maintained and known, as the new building 114 next door to an older building 116 is being constructed.

Figures 18, 19:
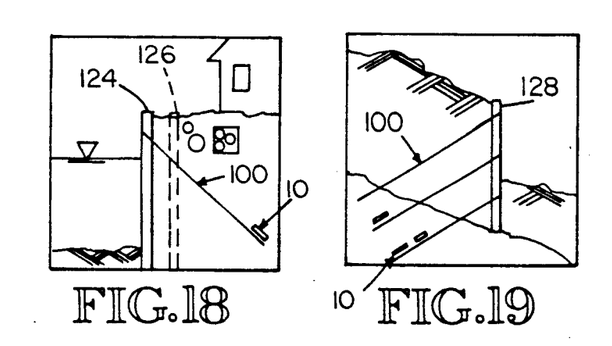
FIG. 18 is a schematic side elevational view of the construction of a new bulkhead spaced in front of an old existing bulkhead, indicating how tie backs, equipped with strain gage assemblies, are utilized.
FIG. 19 is a schematic side elevational view of the construction of an earth side control wall, showing how tie backs, equipped with strain gage assemblies, are utilized.
Figure 20:
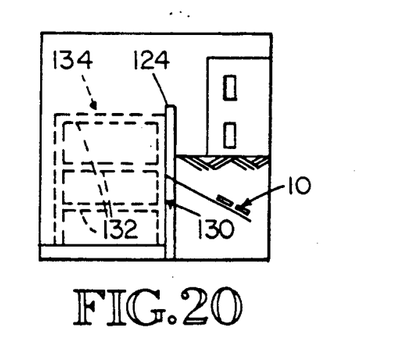
FIG. 20 is a schematic side elevational view of the construction of the basement foundation and lower floors of a new building, illustrating how tie downs, equipped with strain gage assemblies, are utilized.

In FIG. 18 a new waterfront bulkhead 124 is illustrated which has been installed in front of an older existing bulkhead 126, and the tie back anchor assembly 100 has a strain gage assembly 10. In FIG. 19, an earth side control wall 128 has tie back anchor assemblies 100 equipped with strain gage assemblies 10. How the basement 130 and lower floors 132 of a new building 134 and a retaining wall 124 are also held by tie down assemblies 101, equipped with strain gage assemblies 10, is illustrated in FIG. 20.

Figure 21:
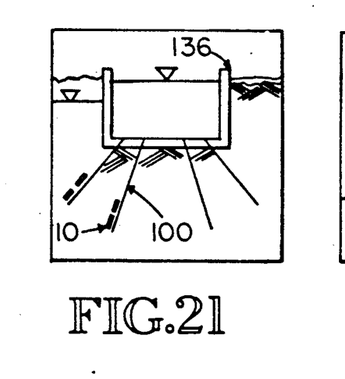
FIG. 21 is a schematic cross-sectional view of a liquid tank, installed at and below ground level, indicating how tie downs, equipped with strain gage assemblies, are utilized to keep the liquid tank in place against any and all hydrostatic pressures.
Figure 22:
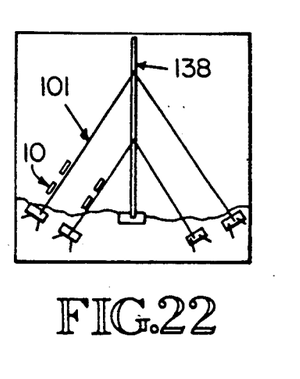
FIG. 22 is a schematic side elevational view of the resulting erection of an aerial structure such as a radio transmitting tower, illustrating how tie downs, equipped with strain gage assemblies are utilized.
Figure 23:
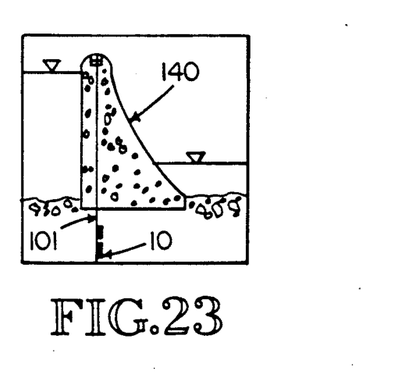
FIG. 23 is a schematic side elevational view of an existing concrete water dam on a river, showing how tie downs, equipped with strain gage assemblies, are utilized.

A liquid tank 136 installed at ground level and below ground level is shown in FIG. 21 having tie down assemblies 101 equipped with strain gage assemblies 10. Also tie down assemblies 101 equipped with strain gage assemblies 10 are used to maintain the vertical position of an aerial structure 138, such as a radio transmitting tower 138, as illustrated in FIG. 22. Tie down assemblies 101 equipped with strain gage assemblies 10, are used to tie down concrete water dams 140 on rivers as shown in FIG. 23.

Figures 24, 25:
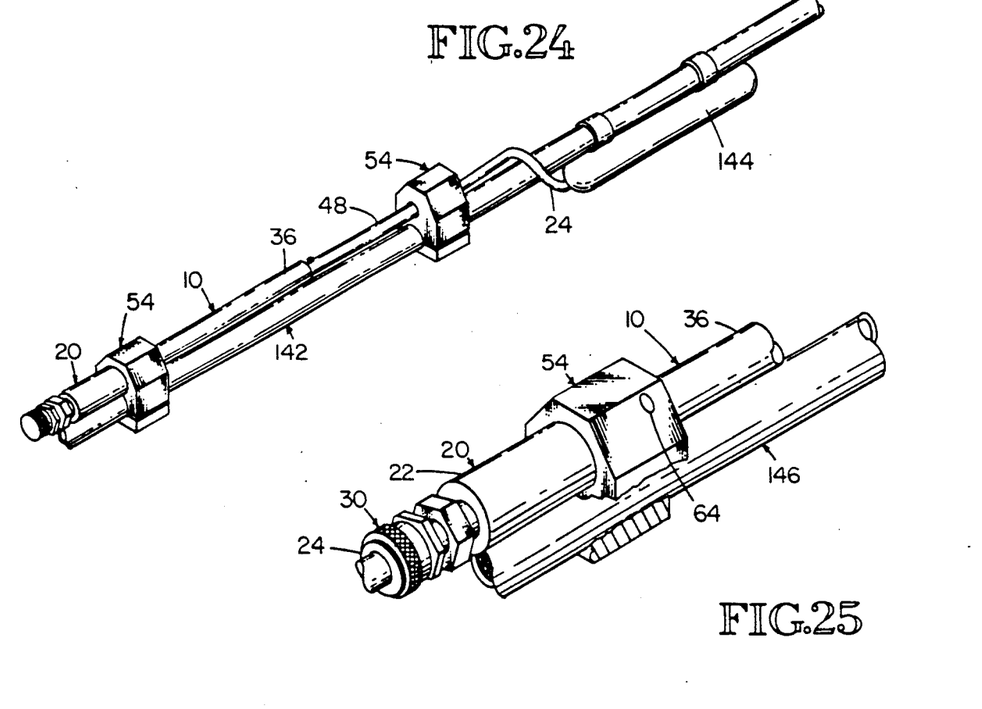
FIG. 24 is a partial perspective view of an electrical transmission cable on which a strain gage assembly has been mounted to monitor any excessive tensile strain.
FIG. 25 is a partial perspective view of a fiber optic cable on which a strain gage assembly has been mounted to monitor any excessive tensile strain.

Apart from considerations of whether or not building structures are keeping in their original earth locations, there are considerations of whether portions of structures, per se, are not being overstressed. In FIG. 24, an electrical transmission cable 142 is shown, on which is mounted a strain gage assembly 10. The stress of this electrical transmission cable 142 is selectively or constantly monitored, and the level of stress signal, carried over the electrical cable lead 24 to a radio transmitter, is thereafter broadcast to a receiver (not shown) at a distant location. Excessive stresses causing strains, may occur during winter ice storms, and during wind storms at anytime of the year.

Also, in reference to fiber optic communication cable 146, any excess stress generally results in a fracture of the fiber optic cable 146. Therefore, to gain knowledge of where such a fracture has occurred a strain gage assembly 10 is installed, as shown, in part, in FIG. 25.

Figures 26, 27:
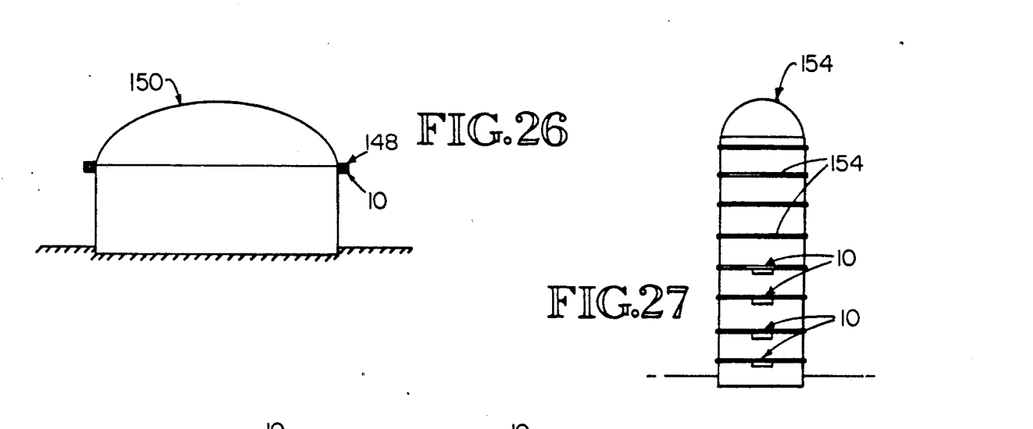
FIG. 26 is a cross-sectional elevational view of a dome sports arena, illustrating where the tension ring is installed, on which the strain gage assemblies have been mounted.
FIG. 27 a cross sectional elevational view of a silo, showing where the tension rings are installed, on which the strain gage assemblies have been mounted.

In many different structures steel construction cables 14 are used, and the knowledge is needed at all times, either at selected time periods, or continuously, to be assured that these steel construction cables 14 are not being overstressed. When tension rings 148, composed of such cables 14 are used in domed stadiums 150 or the like, such knowledge is wanted. Also when reinforcing rings 152 about a silo 154 are used, such knowledge is wanted. Therefore, these buildings have these steel structure cables 14, equipped with strain gage assemblies 10, and with accessories to transmit and record the stress levels.

Figure 28:
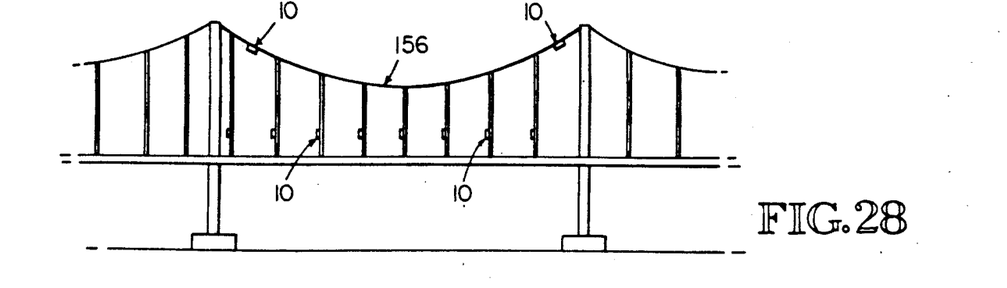
FIG. 28 is a cross sectional elevational view of a suspension bridge, showing where strain gage assemblies have been mounted on the supporting steel structural cables.
Figure 29:
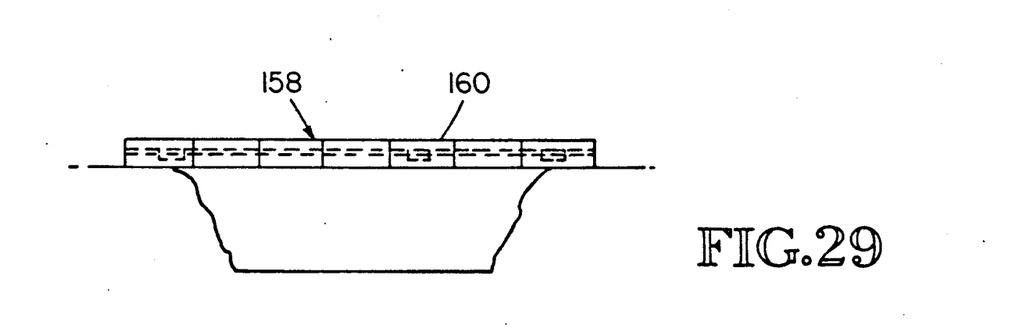
FIG. 29 is a schematic cross sectional elevational view of a pretensioned bridge structure referred to as a prestressed bridge structure, showing where strain gage assemblies have been mounted on the pretensioned steel structural cables.

In FIGS. 28 and 29, two types of bridges are illustrated. In the FIG. 28, a suspension bridge 156 is shown schematically, where the suspension cables 14 are equipped with strain gage assemblies 10. In FIG. 29 a river or ravine crossing bridge 158 is illustrated which is referred to as a pretensioned bridge 158, wherein the structures used are referred to as prestressed structures 160. The steel construction cables 14 incorporated into these prestressed structures 160, are equipped with strain gage assemblies 10, and accessories for conveying the information about possible excessive stresses.

Figure 30:
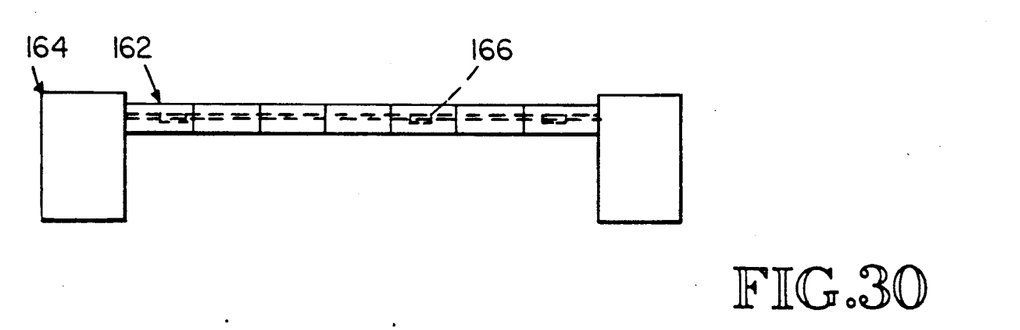
FIG. 30 is a schematic cross sectional elevational view of one of many post tensioned floors of a building, indicating where the strain gage assemblies have been mounted on the post tensioned steel structural cables.

In FIG. 30, a portion 162 of a building 164 is illustrated, in which post tensioned floors 166 are installed. The steel structural cables 14 used in these post tensioned floors 166, are equipped with strain gage assemblies 10, and accessories for conveying the information about the level of the stresses.

In respect to all the possible installations of these strain gage assemblies 10, which have the capability of accommodating slight twisting of the flexible elongated members, there is always provided a source or sources of the important information on the levels of stresses, which will be observed by those persons initially responsible for being assured themselves, and assuring others that the monitored structures are remaining safe. Or if the monitored structures are deviating from their safety range, this person will alert other persons about the deviations and appropriate actions will be undertaken. In specific reference to earthquake regions, by the utilization of these strain gage assemblies 10 and their accessories, to monitor stresses during both static and dynamic conditions, at selected times, or continuously, knowledge will be gained essentially instantaneously, which will help all persons interested in knowing how safe many structures are remaining.

By using many available data recording and transmitting products in conjunction with the strain gage assemblies 10, the necessary knowledge of the conditions of many structures may be gathered at one or more locations for observance by persons who can initiate any necessary corrective and/or preventative actions.

I claim:

1. The combination of a tensionable ground cable anchor, serving as tieback cable anchor or a tiedown cable anchor, and a strain gage assembly, comprising:
   (a) a tensionable ground cable anchor having two ends, a first end being accessible at one observable structural connection pretensioning location, and a second end being accessible to be bonded in cement grout, within a provided bore hole, in turn to be surrounded by ground, for the purpose of anchoring and securing a structure or a structural component;
   (b) a strain gage assembly having two ends, a first end being clamped at a first location of the tensionable ground cable anchor, and the second end being clamped at a second spaced location of the tensionable ground cable anchor, and this strain gage assembly is clamped near the second end of the tensionable ground cable anchor to be bonded in cement grout throughout the bonded length thereof;
   (c) a flexible filler material positioned about the strain gage assembly after the two ends thereof have been clamped to the tensionable ground cable anchor, to provide space for lengthening of the cable during the application of a load to the tensionable ground cable anchor;
   (d) cement grout poured about the flexible filler material, covering the strain gage assembly, and beyond about the tensionable ground cable anchor, throughout the bonded length, and to be in turn surrounded by ground; and
   (e) means to operate and to observe the functioning of the strain gage assembly.

2. The combination of the tensionable ground cable anchor and the strain gage assembly, as claimed in claim 1, wherein the strain gage assembly, comprises in turn:
   (a) a vibrating wire strain gage, having all the necessary components thereof which include among these necessary components in housing, a vibrating wire having two ends, a first end thereof secured to the housing, and a second end thereof extending out from the housing, electrical circuit wire having two ends, the first ends thereof secured within the housing and second ends thereof extending out from the housing, through the flexible filler material, through the cement grout, and beyond to the observable structural connection pretensioning location, where the first end of the tensionable ground cable anchor is positioned, and there to be connected to the means to operate and to observe the functioning of the strain gage assembly;
   (b) a larger diameter tube shaft having two ends, the first end thereof secured to the housing of the vibrating wire strain gage, and a second end thereof extending from the housing of the vibrating wire strain gage;
   (c) a calibrated coiled spring, to increase the strain measuring range of the vibrating wire strain gage, having two ends, positioned within the larger diameter tube shaft, and a first end of this calibrated coiled spring is connected to the second end of the vibrating wire, which extends out of the housing of the vibrating wire strain gage, the second end of this calibrated coil spring extends farther within this larger diameter tube;
   (d) a smaller diameter tube shaft for telescoping within the larger diameter tube shaft and extending therefrom, having two ends, the first end thereof is connected to the second end of the calibrated coil spring, which extends within the larger diameter tube, and the second end thereof extends clear of the larger diameter tube shaft;
   (e) a means to securely position the second end of the smaller diameter tube shaft at a second location on the tensionable ground cable anchor; and
   (f) a means to securely position the housing of the vibrating wire strain gage and the larger diameter tube shaft at a first location on the tensionable ground cable anchor, which is spaced from the second location on the tensionable ground cable anchor, where the second end of the smaller diameter tube shaft is connected,
whereby, when a tensionable ground cable anchor is loaded, this vibrating wire strain gage provides an electrical signal indicating a corresponding and proportional strain value in the tensional ground cable anchor.

3. The combination of the tensionable ground cable anchor and the strain gage assembly, as claimed in claim 2, combined in turn with other like combinations of the tensionable ground cable anchor and the strain gage assembly.

4. The combinations of the combination of the tensionable ground cable anchor and the strain gage assembly, as claimed in claim 3, wherein at the second ends of the tensionable ground cable anchors, these tensionable ground cable anchors are separated, to provide space where the strain gage assemblies are secured, and the flexible filler material is positioned about these separated ground cable anchors and their respective strain gage assemblies, and thereafter the grout is poured about the flexible filler material and beyond throughout the bonded length.

5. The combinations of the combination of the tensionable ground cable anchor and the strain gage assembly, as claimed in claim 4, wherein the tensionable ground cable anchors are separated, then returned together, and then separated again and returned together to create at least two locations where the flexible filler material is positioned about these separated tensionable ground cable anchors and their respective strain gage assemblies, and thereafter the cement grout is poured about the flexible filler materials, and beyond throughout this bonded length.

6. A strain gage assembly having two ends, a first end being clampable to a first location on a tensionable ground cable anchor, and a second end being clampable at a second spaced location on a tensionable ground cable anchor, comprising:

(a) a vibrating wire strain gage, having all the necessary components thereof, which include among these necessary components, a housing, a vibrating wire having two ends, a first end thereof secured to the housing, and a second end thereof extending out from the housing, electrical circuit wires having two ends, the first ends thereof secured within the housing and the second ends thereof extending out from the housing and continuing to reach an observable instrument reading locale;

(b) a larger diameter tube shaft having two ends, the first end thereof secured to the housing of the vibrating wire strain gage, and a second end thereof extending from the housing of the vibrating wire strain gage;

(c) a calibrated coiled spring, to increase the strain measuring range of the vibrating wire strain gage, having two ends, positioned within the larger diameter tube shaft, and a first end of the calibrated coiled spring is connected to the second end of the vibrating wire, which extends out of the housing of the vibrating wire strain gage, the second end of this calibrated coil spring extends farther within this larger diameter tube;

(d) a smaller diameter tube shaft for telescoping within the larger diameter tube shaft and extending therefrom, having two ends, the first end thereof is connected to the second end of the calibrated coil spring, which extends within the larger diameter tube, and the second end thereof extends clear of the larger diameter tube shaft;

(e) a means to securely position the second end of the smaller diameter tube shaft a second location on a tensionable ground cable anchor; and (f) a means to securely position the housing of the vibrating wire strain gage and the larger diameter tube shaft is a first location on a tensionable ground cable anchor, which is spaced from the second location on the tensionable ground cable anchor, where the second end of the smaller diameter tube shaft is connected, whereby, when a tensionable ground cable anchor is loaded, this vibrating wire strain gage provides an electrical signal indicating a corresponding and proportional strain value in the tensional ground cable anchor.

* * * * *